No. 690,574. Patented Jan. 7, 1902.
J. HERBS.
ROASTING PAN.
(Application filed July 18, 1901.)

(No Model.) 2 Sheets—Sheet 1.

Inventor
Joseph Herbs,

Witnesses
By H. B. Willson & Co
Attorneys

THE NORRIS PETERS CO., PHOTO-LITHO., WASHINGTON, D. C.

No. 690,574. Patented Jan. 7, 1902.
J. HERBS.
ROASTING PAN.
(Application filed July 18, 1901.)
(No Model.) 2 Sheets—Sheet 2.

Witnesses
Inventor
Joseph Herbs
By H. B. Willson & Co
Attorneys

UNITED STATES PATENT OFFICE.

JOSEPH HERBS, OF REDLANDS, CALIFORNIA.

ROASTING-PAN.

SPECIFICATION forming part of Letters Patent No. 690,574, dated January 7, 1902.

Application filed July 18, 1901. Serial No. 68,791. (No model.)

*To all whom it may concern:*

Be it known that I, JOSEPH HERBS, a citizen of the United States, residing at Redlands, in the county of San Bernardino and State of California, have invented certain new and useful Improvements in Roasting-Pans; and I do declare the following to be a full, clear, and exact description of the invention, such as will enable others skilled in the art to make and use the same.

The invention has relation to roasting-pans; and the particular object in view is to provide a roasting-pan with means for automatically basting the roast, which means shall be simple of construction, durable in use, and comparatively inexpensive of production, means being provided for basting the roast with its own juices.

With these and other objects in view the invention consists of certain novel features of construction, combination, and arrangement of parts, which will be hereinafter more fully described, and particularly pointed out in the appended claims.

Figure 1:
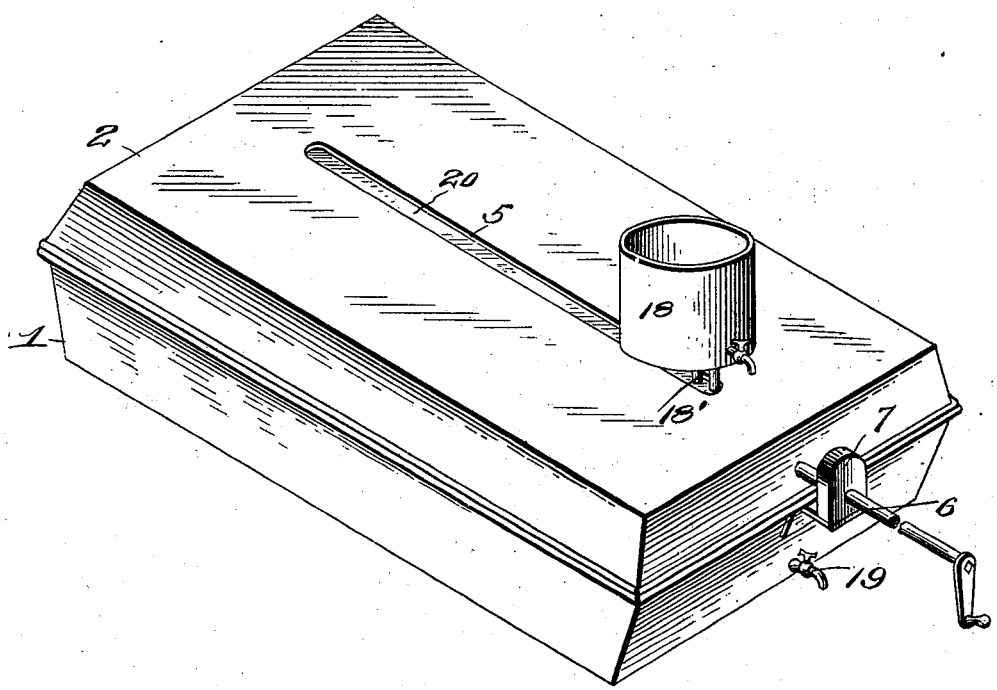
Figure 2:
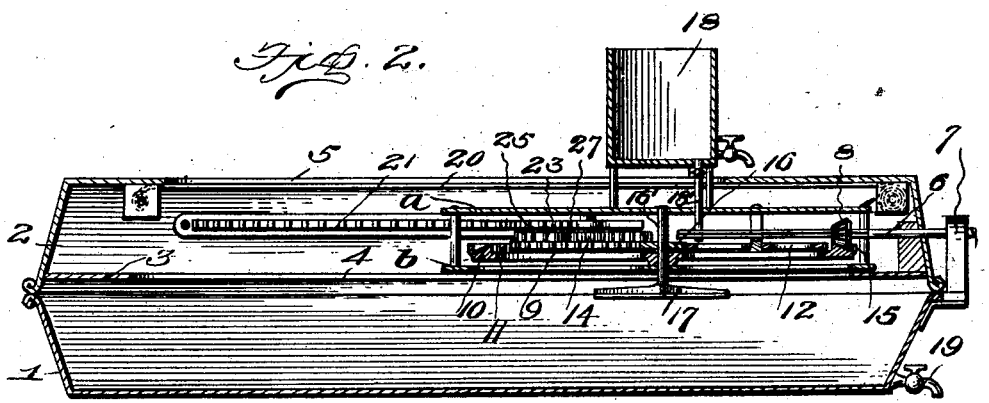
Figure 3:
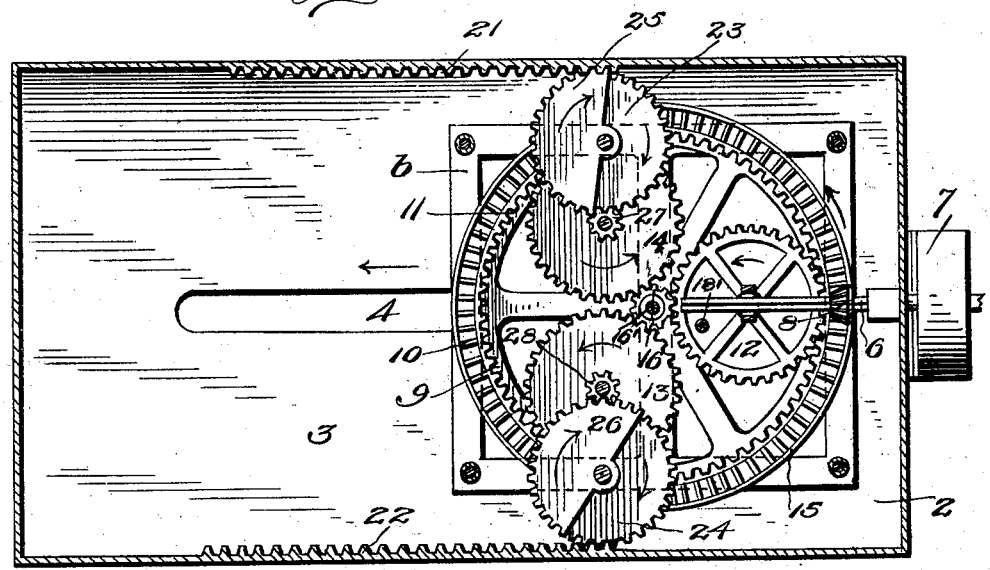
Figure 4:
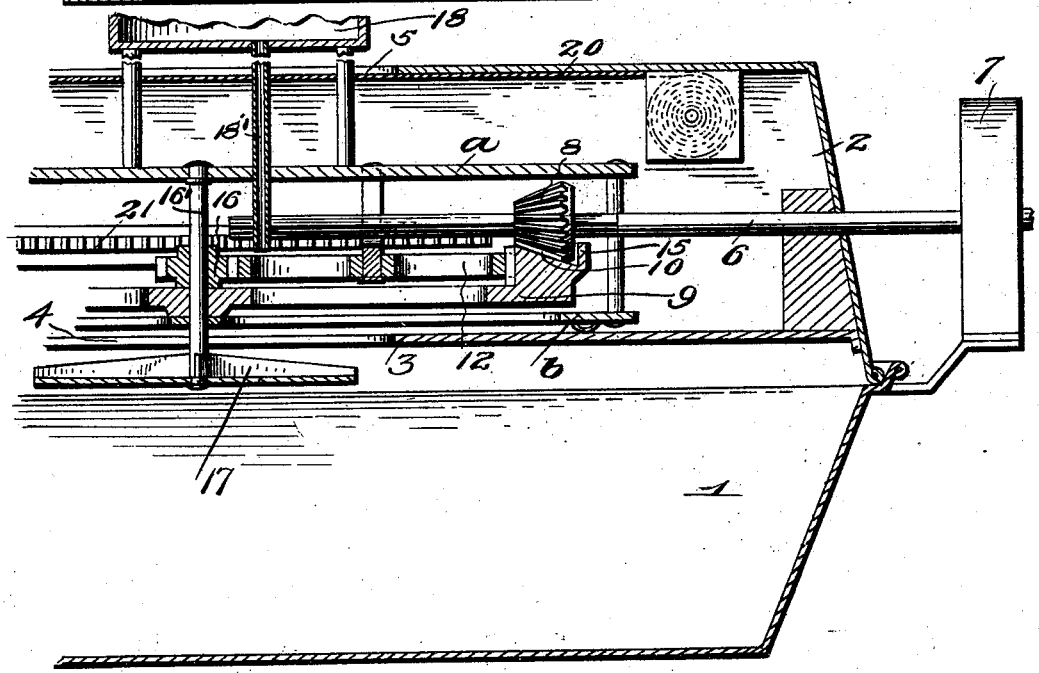

In the accompanying drawings, Figure 1 is a perspective view of my improved roasting-pan. Fig. 2 is a longitudinal vertical sectional view. Fig. 3 is a horizontal sectional view through the cover to illustrate the gearing for reciprocating the basting-cup, and Fig. 4 is a longitudinal vertical sectional view on an enlarged scale.

Referring to the drawings, 1 denotes the body of the pan, which may be of any well-known or approved construction, and 2 denotes its cover. The cover is provided with a horizontally-disposed partition 3, formed with a longitudinal slot 4, which registers with a similar slot 5, formed in the top of the cover proper.

6 denotes a shaft suitably journaled in bearings and disposed between the top and the partition of the cover and provided at one end with suitable means for rotating it, shown in the present instance inclosed within a motor-casing 7, although, if desired, a motor may be used or simply a crank. This shaft has mounted upon it a drive-pinion 8, which is free to slide upon said shaft, but rotates with it. To accomplish this, I preferably make the shaft polygonal and form the pinion 8 with a corresponding aperture to receive the shaft.

9 denotes a master-wheel having beveled teeth 10 in mesh with the pinion 8. It has also internal teeth 11, which mesh with suitably-journaled gear-wheels 12, 13, and 14. The master-wheel 9 has an annular guard-flange 15, which after the pinion 8 has been slid in one direction on its shaft will on the return of the gearing to its point of starting cause said pinion to be moved with said gear, (see Fig. 4,) the gearing above described being mounted in a frame consisting of the parallel plates $a$ and $b$, supported by the partition 3 and adapted to slide thereon.

16 denotes a pinion suitably mounted between the peripheries of the gears 12, 13, and 14, and to this pinion is connected a shaft 16'. The lower end of said shaft projects through the slot 4 in the cover-partition 3 and is provided with a spraying-head 17 for discharging the basting liquid upon the roast. The sprayer-head 17 preferably consists of a circular disk or plate having upon its upper surface a series of radial ribs or flanges, which when rotated will cause any liquid being dropped on said plate to be discharged or sprayed therefrom, due to the centrifugal motion thereof.

A basting-cup 18 is suitably mounted above the pan upon two posts arising through the slot 5 of the cover 2 and fixed to the plate $a$ of the movable gear-carrying frame, and depending from the cup 18 and also extending through the slot 5 is a valve-controlled drip-tube 18' for carrying the basting liquid from the cup to the spraying-head.

A draw-off cock 19 leads from the body of the pan and permits of the juices being drawn off for the purpose of replenishing the basting-cup. That the odors may not escape through the slot 5 in the top of the cover, I provide a cover-strip, which consists of a spring-metal tape 20, coiled at each end, as shown, and connected to the traveling gear-frame and basting-cup, so that as said frame and cup is moved back and forth the tape will be alternately drawn out and wound up, so as to close the slot 5 and prevent the escape of the fumes. The posts and tube 18' of the basting-cup pass through and are connected to this tape.

21 and 22 denote parallel rack-bars secured to the sides of the cover.

23 and 24 denote suitably-journaled gear-wheels, to the axes of which are fixed segmental gears 25 and 26, which are adapted to alternately engage the rack-bars 22 and 21, respectively, to cause a reciprocation of the gear-frame, basting-cup, and metal tape 20 and spraying-head 17. The gears 23 and 24 mesh with pinions 27 and 28, respectively. These pinions are fixed to the shafts of the gears 13 and 14, which shafts, together with the shafts of gears 23 and 24, are mounted in and depend from the plate a of the gear-frame.

In operation, the shaft 6 being set in motion by any suitable device or mechanism, the pinion 8 will be rotated, thus rotating the master-wheel 9 and the wheels 12, 13, and 14. The movement of these latter wheels will rotate the pinion 16, shaft 16', and spraying-head 17, attached to the lower end of the shaft 16', thus causing said head to effectually distribute the liquid upon the roast, and the movement of the wheels 13 and 14 will also be transmitted to the wheels 23 and 24 to rotate the segmental gears 25 and 26. It will be observed upon following the direction of movement of the various gears, as indicated by the various arrows, that as one segmental gear is meshing with its rack-bar to move the basting-cup, gear-frame, and spraying-head in one direction the other segmental gear is free from engagement with its rack-bar; but at the instant the first segmental gear disengages its rack-bar the second segmental gear comes into engagement with its rack-bar and moves the basting-cup, gear-frame, and spraying-head in the opposite direction. It will thus be seen that not only is rotary movement imparted to the spraying-head, but also reciprocating motion, so that the basting liquid will reach all parts of the pan and be evenly distributed upon the roast.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with a roasting-pan, of a reciprocatory basting-cup adapted to discharge its contents within said pan, substantially as set forth.

2. The combination with a roasting-pan, of a reciprocatory basting-cup adapted to automatically discharge its contents within said pan, substantially as set forth.

3. The combination with a roasting-pan, of a basting-cup having a spraying-head located within said pan, and means for reciprocating said spraying-head, substantially as set forth.

4. The combination with a roasting-pan, of a basting-cup having a spraying-head located within said pan, and means for rotating said spraying-head, substantially as set forth.

5. The combination with a roasting-pan, of a basting-cup having a spraying-head located within said pan, and means for reciprocating and rotating said spraying-head, substantially as set forth.

6. The combination with a roasting-pan having a slotted cover, of a basting-cup located upon the cover and having a discharge-tube extending downwardly into the pan, a spring-actuated ribbon secured at the opposite ends of the slot in said cover and connected to the basting-cup and adapted to close the said slot, and means for reciprocating said basting-cup, substantially as set forth.

7. The combination with a roasting-pan and its cover, of parallel fixed rack-bars, a basting-cup located on the exterior of the cover and having a discharge-tube extending into the body of the roasting-pan, a rotary spraying-head to catch the discharge from said tube, segmental gears arranged to alternately engage the rack-bars, and a train of gearing for rotating said pinion and said segmental gears to reciprocate the basting-cup, substantially as set forth.

8. The combination with a roasting-pan and its cover, of fixed rack-bars, a master-wheel having internal and beveled teeth, a suitably-journaled shaft, a pinion free to slide upon said shaft and keyed to rotate therewith and in mesh with the beveled teeth, gear-wheels in mesh with the internal teeth of the master-wheel and two of which are provided with fixed pinions, segmental gears in mesh with the rack-bars, and gear-wheels fixed to said segmental gears and in mesh with said last-named pinions, and a basting-cup mounted to reciprocate with the master-wheel, substantially as set forth.

In testimony whereof I have hereunto set set my hand in presence of two subscribing witnesses.

JOSEPH HERBS.

Witnesses:
A. S. McPHERRON,
F. LOUISE PHELPS.